Aug. 4, 1953
F. M. JONES
2,647,287
LOCKING MECHANISM
Filed July 14, 1950
3 Sheets-Sheet 1
FIG. 1.
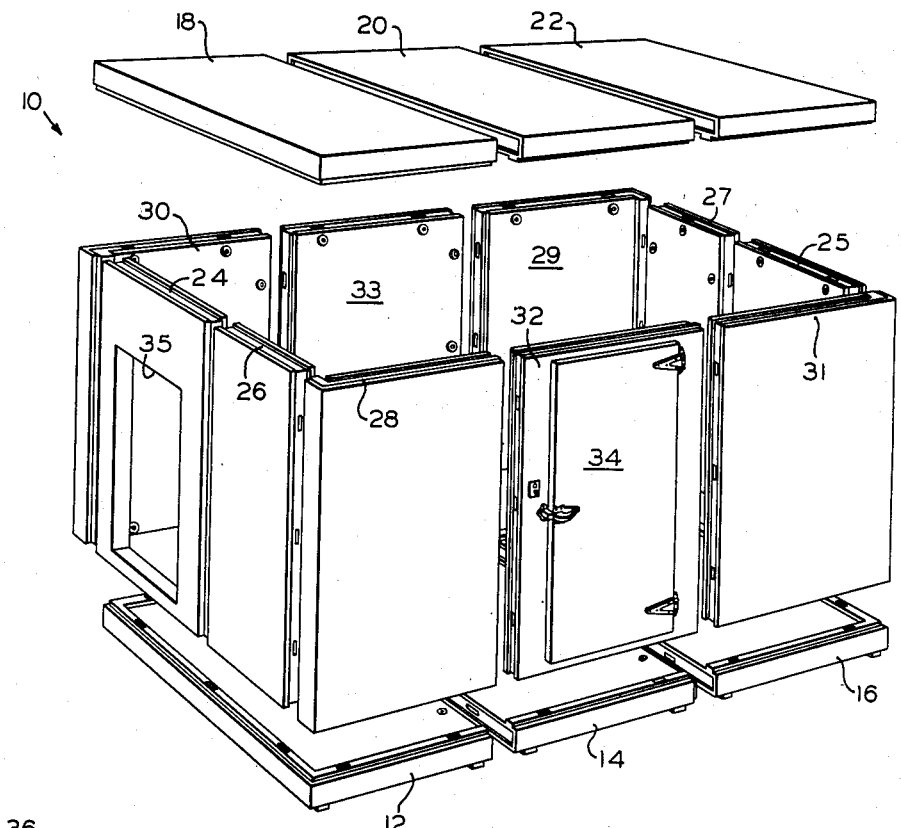
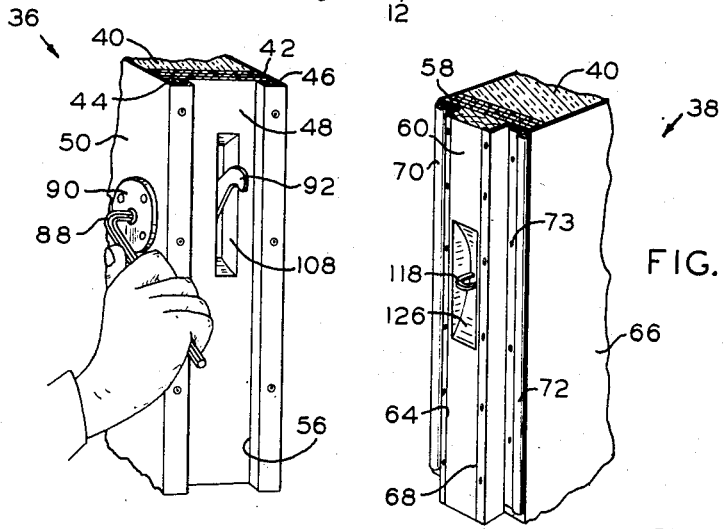
FIG. 2.
FIG. 3.
INVENTOR.
FREDERICK M. JONES
BY
Whitley and Caine
ATTORNEYS Aug. 4, 1953

F. M. JONES 2,647,287

LOCKING MECHANISM

Filed July 14, 1950

INVENTOR.
FREDERICK M. JONES
BY
Whiteley and Caine
ATTORNEYS

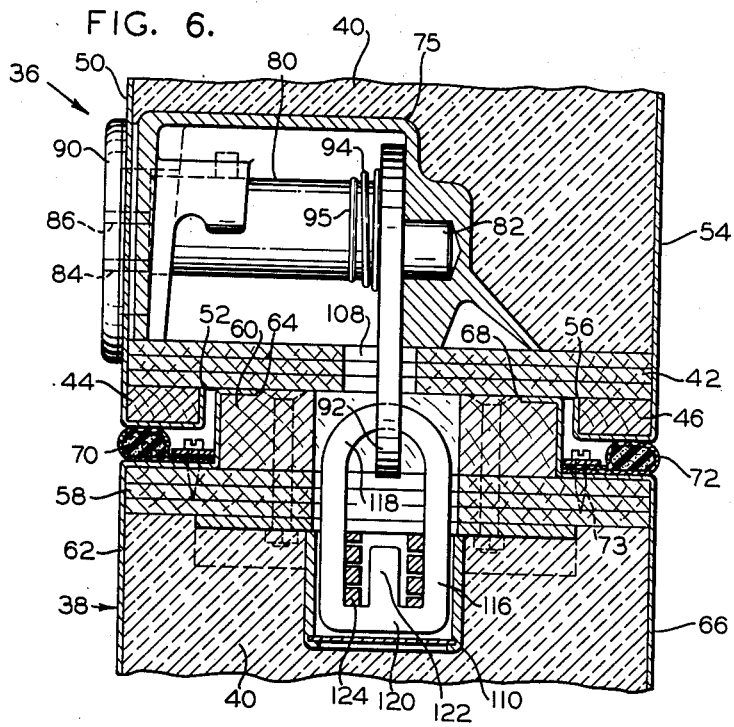

Patented Aug. 4, 1953

2,647,287

UNITED STATES PATENT OFFICE 2,647,287

LOCKING MECHANISM

Frederick M. Jones, Minneapolis, Minn., assignor to The U. S. Thermo Control Co., Minneapolis, Minn., a corporation of Minnesota Application July 14, 1950, Serial No. 173,783

5 Claims. (Cl. 20—4)

My invention relates to improvements in a locking mechanism. In general it relates to a mechanism for interlocking the joining surfaces of a pair of wall members. While the invention is applicable to various types of wall members, it particularly relates to a means for interlocking prefabricated walls of a refrigerator construction.

In recent years it has become the practice in building various types of refrigerator cabinets and particularly those which are used for commercial purposes or for relatively large storage spaces, to prefabricate the various elements making up the walls of the cabinet and then assemble the structure at the place of use. This arrangement not only effects a saving in shipping the parts of the cabinet which under certain conditions may be critical, but it also facilitates the handling of the parts of a relatively large structure. Moreover, in many instances it is desirable to provide this form of construction for a knockdown type of cabinet which can be moved from place to place.

In my copending application, Serial No. 719,822, filed June 2, 1947, now Patent 2,535,682, dated December 26, 1950, I have shown a form of refrigerator cabinet composed of a plurality of prefabricated wall members. Each of these wall members constitute a complete structure in itself and each is provided with at least one joining surface which is adapted to cooperate with the joining surface of another wall to form a suitable closure. In my prior disclosure each of the prefabricated walls is formed with either a tongue or grooved joining surface which is adapted to interfit with an opposite type joining surface on another wall member. The junction between the walls in each instance is secured by a relatively heavy threaded bolt which cooperates with a threaded socket that is embedded in one of the joining surfaces. Moreover, to render the junction air-tight, suitable resilient gaskets are positioned on opposite sides of the joint and form an air-tight seal at the junction. While the means of joining the walls of a cabinet as shown in my prior disclosure is satisfactory for relatively permanent installations, it is not entirely satisfactory for use in installations which are of a temporary nature or where the operators who perform the assembly are not specifically trained for this purpose. Typical examples of a knockdown cabinet for a temporary use are found in portable storage lockers and also in large cabinets providing temporary terminal storage for perishable foods of a seasonable character which are awaiting transportation. In both of these instances the storage enclosures must be of a nature such that they can, if necessary, be readily disassembled and transported to other places of use. Under such conditions fastening devices such as are shown in my prior disclosure, which are of a removable character, can be lost in handling. Moreover, through repeated use of fastening devices of that type there is likelihood of injury to the threaded members resulting in an imperfect junction between the wall members.

In the present invention I have provided a locking mechanism particularly intended for use in prefabricated structures and more particularly for knock-down refrigerator cabinets, wherein the locking mechanism forms a permanent part of each wall member and is capable of providing a secure and satisfactory joint after repeated use. The locking mechanism comprises a movable member carried by one of the walls which is adapted to engage a relatively stationary member carried on an adjoining surface of another wall. In general a latch member in the form of a staple is carried in the joining surface of one of the walls and is adapted to be engaged by a hook-like member carried on the joining surface of another wall member. The hook-like element is carried by an eccentric cam which provides oscillatory movement for the hook to effect engagement with the latch, and also to provide an overcenter locking action with respect to the latch. A detent is provided between the cam and the hook-like element to aid in the locking and unlocking action, and a suitable abutment is provided to control the action of the cam. To compensate for any irregularities of the parts, including the joining surfaces of the walls, a resilient take-up is associated with the latch to insure a tight junction between the walls.

An object of the invention is to provide fastening means carried within the joining surfaces of a pair of panels, comprising a two part locking mechanisms, one part consisting of a locking member that is releasably held by means of a spring biased detent on a driven member having an eccentric over-center movement, the detent acting to release the driven member from the locking member when the latter engages a latch to thereby permit continued movement of the driven member through an over-center position to securely lock the locking member with the latch.

Another object is to provide a locking mechanism composed of a locking member that is releasably held in moving engagement with an eccentric cam by means of a resilient detent which acts to release the locking member from the cam after the locking member has engaged a latch, together with biasing means secured to the latch that forms a resilient connection between the members and holds the parts together as well as providing compensation for minor differences in the parts and the members which they hold in locked relationship.

A further object is to provide in combination with a refrigeration cabinet formed of prefabricated walls, each of which has at least one joining surface formed of material of low thermal transfer capacity, a locking mechanism composed of parts carried by two such wall members and embedded in their joining surfaces, and in which one part constitutes a resilient supported staple while the other constitutes a hook which is carried by an eccentric element having an over-center movement and in which a detent forms the connection between the eccentric and the hook to provide locking action when the hook engages the staple.

Other and further objects may become apparent from the following description and claims, and in the appended drawings in which:

Fig. 1 is an exploded perspective of a prefabricated refrigerator cabinet to which the present invention applies;

Figs. 2 and 3 are perspective views of portions of two of the prefabricated panels disclosed in Fig. 1 and showing the locking mechanism forming the present invention;

Fig. 6 is a plan view taken on line 6—6 of Fig. 5;

Fig. 7 is a side elevation of a portion of the construction shown in Figs. 4 and 5; and, Fig. 8 is a front perspective of the structure shown in Fig. 7.

Figure 4:
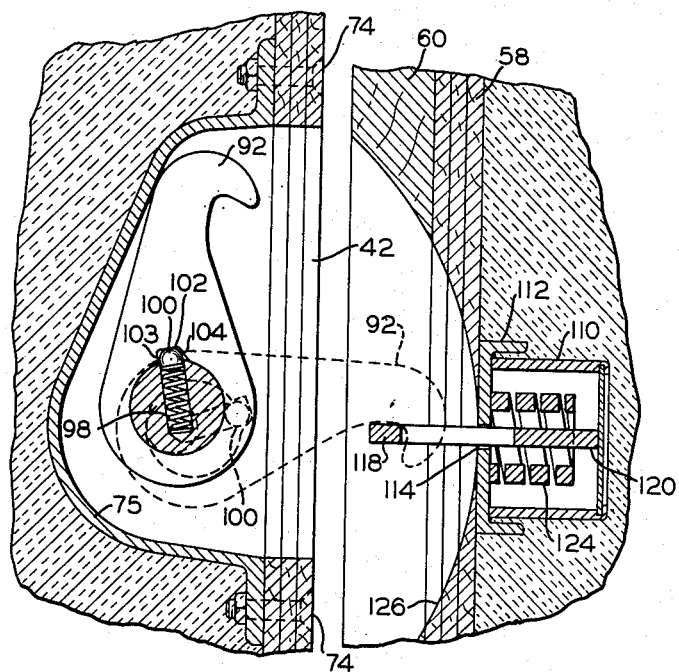
Fig. 4 is a vertical section taken through two adjoining panels of the construction shown in Fig. 1 and showing parts of the locking mechanism.

Referring now to the several views of the drawings, the invention will be described in detail. Referring first to Fig. 1, general reference numeral 10 indicates a refrigerator cabinet which is of a knock-down type of construction generally referred to as a walk-in box. Cabinet 10 is composed of several individual prefabricated panels, of which members 12, 14 and 16 collectively form the bottom wall. Indicated at 18, 20 and 22 are three panels which collectively form the top wall. Reference numerals 24 and 25 constitute similarly shaped end panels, while reference numerals 26 and 27 are also similarly shaped end panels which cooperate with panels 24 and 25. Reference numerals 28 and 29 constitute a pair of similarly shaped side panels which are positioned on opposite corners of the cabinet, and reference numerals 30 and 31 constitute a second pair of side panels which are of similar shape and design. Panels 32 and 33 constitute similar center panels. Panel 32 is provided with a conventional walk-in door 34, and panel 24 is provided with a large aperture 35 for receiving the heat exchange end of a portable mechanical refrigeration unit, such as is disclosed in my Reissue Patent No. 23,000 dated May 11, 1948. The construction of the several panels making up the refrigerator cabinet 10 is fully disclosed and claimed in my aforementioned Patent 2,535,682.

Referring now to Figs. 2, 3 and 6, the construction of at least two of the panels herein designated generally at 36 and 38 will be described in detail. Each of the panels 36 and 38 is composed of a relatively thick layer of thermal insulation designated at 40. Extending along one edge of panel 36 and in contact with the thermal insulation 40 is a layer of plywood 42. Secured to the lateral edges of plywood layer 42 are wooden strips 44 and 46 which form a grooved surface designated in Fig. 2 at 48. Extending along one side of the panel 36 is a sheet metal layer 50 which is bent in a U-shaped manner around the strip 44 so that its edge terminates at 52. Extending across the other surface of panel 36 is a sheet metal layer 54 which is identical in all respects to sheet metal layer 50 and which extends around the strip 46 with its terminal edge 56 in contact with the plywood layer 42.

Panel 38 is also composed of a layer of thermal insulation 49 which along one edge carries a plywood layer 58. Secured along the center of plywood layer 58 is a wooden tongue-shaped member 60 which is of a width to fit within the grooved surface 48 of panel 36. A sheet metal layer 62 extends along the outer side of panel 38 and is recurrently bent over an edge of plywood layer 58 so that its terminal edge 64 extends partially across the outer side of the tongued surface 60. A similar metal layer 66 extends across the other surface of panel 38 and has its terminal edge 68 extending along the opposite side of the tongued surface 60. Resilient gaskets 70 and 72 are secured along a portion of the recurrently bent layers 62 and 66 and are held in place by fastening means 73. By examination it will be seen that the joined edges of panels 36, 38 are formed in tongued and grooved surfaces which cooperate with each other in such a manner as to provide an area of low thermal transfer capacity by means of the center portions of tongue 60 and plywood layer 42. The purpose of this construction is to prevent heat transfer through a metal-to-metal contact and also to seal the joint against the passage of air. It should be understood that all of the joining surfaces of the several panels making up the cabinet 10 are alternately formed with either tongued or grooved surfaces such as has been described.

Within each of the panels having a grooved joining surface 48 is embedded a cup-shaped member 75 which is best disclosed in Figs. 7 and 8. The member 75 is placed within the insulation 40 and is secured to the inner surface of the plywood layer 42 by conventional fastening means 74 passed through aperture 76 in the edges of the cup-shaped member 75. The rear side of cup-shaped member 75, as shown in Fig. 7, contains indentation 77 forming a pair of abutments 78 and 79 whose purpose will be explained hereinafter. Journaled within the lateral sides of cup 75 is a cam 80 which is of an eccentric nature and supported by bearings 82, 84 for eccentric rotation. Bearing 84 has a hollow hexagonal indentation 86 for the insertion of a standard hexagonal wrench 88, shown in Fig. 3. Surrounding bearing 84 is a face plate 90. A hook member 92 is loosely mounted on cam 80 and is held against a shoulder 93 of casing 75 by a coil spring 94 which has one end secured in a groove 95 of the cam 80. Within an axially extending slot 96 in cam 80 is positioned a small coil spring 98 which at its outer end contacts a sphere 100. The sphere 100 with the coil spring 98 forms a detent which is adapted to enter a slot 102 in the hook-shaped member 92.

Figure 5:
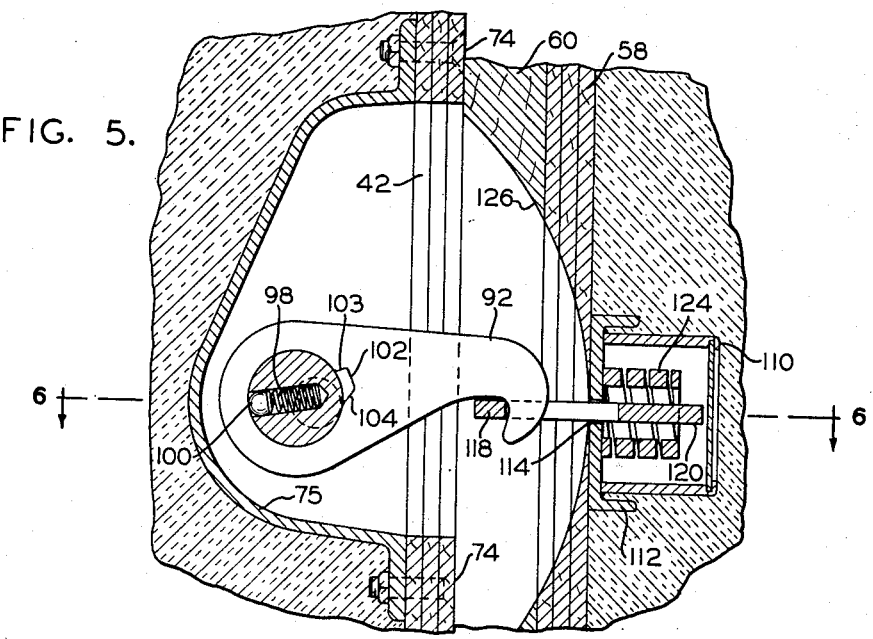
Fig. 5 is a view similar to Fig. 4 showing parts in an alternative position.

As will be evident on examination of Figs. 4 and 5, slot 102 has a sharp rear edge 103 and a sloping forward edge 104. Also mounted within the cam 80 and extending outwardly therefrom is a pin 106 which is adapted to engage the abutments 78 and 79 on casing 75. As will be evident on examination of Fig. 2 and will be explained hereinafter, the hook-shaped member 92 extends outwardly through the front opening of the casing and penetrates a slot 108 in the grooved surface 48.

Cooperating with the hook 92 is a latch member which is seen in Figs. 3, 4, 5 and 6. Within the interior of panel member 38 and in contact with the inner surface of the plywood layer 58 is a circular cup 110 whose open end is closed by a plate 112 having a slot 114 formed therein. Protruding outwardly through the slot 114 is a latch or staple 116 having a curved outer end 118 and a closed rear inner end 120. Protruding inwardly from portion 120 is a stud 122 about which is mounted a very powerful coil spring 124. On examination of Fig. 3 in conjunction with Figs. 4 and 5, it will be evident that the curved outer end 118 of the staple 116 extends outwardly from a recess 126 on the tongued surface 60.

The operation of the invention will now be explained. In constructing the several panels of the refrigerator construction 10, the latching mechanism made up of the casing 75 and its associated parts, and the casing 110 and its associated parts are each embedded within the interior of one of the panels and with a portion of each part of the locking mechanism extending outwardly, as indicated at 108 and 126 in Figs. 2 and 3. When the several panels are to be assembled in the manner shown in Fig. 1, the tool 88 is placed in the recess 86 of the bearing end 84 of cam 80 and rotated in a counter-clockwise direction to retract the hook member 92. Thereafter, and with the panels in proper alignment with each other, the tool 88 is rotated in a clockwise direction from the full line position shown in Fig. 4 to the position shown in Fig. 5 to effect the locking action.

Before describing the action that takes place, it should be noted that the hook element loosely surrounds cam 80, and that the operative connection between these members is the detent composed of the biased sphere 100 which fits into the recess 102 and is held in place by the larger coil spring 94. Starting with the hook element 92 in its fully retracted position of Fig. 4, as the cam 80 rotates the hook engages the curved outer end 118 of the latch 116 and then begins to retract within casing 75. When the latch has been engaged spring 124 will resist movement and on further rotation of cam 80, sphere 100 moves out of the sloping forward edge 104 of the slot 102 and against the relatively weak pressure of spring 98. Continued rotation of cam 80 causes its dwell to give an oscillatory movement to the rear end of the hook to positively pull the hook inwardly against the resilience of spring 124, which action continues until the dwell of the cam passes by a few degrees an overcenter position, when its further movement is stopped by pin 106 engaging the abutment 78, as seen in the dotted line position in Fig. 7. The overcenter position of the cam gives a positive locking action to the hook element 92. Coinciding with this operation, the latch or staple 116 has been pulled outwardly against the resilience of the heavy coil spring 124 which is exerting pressure between the base member 120 and the inner surface of the cover 112 so that the engagement is quite firm and any irregularity in parts, including the surfaces of the tongued and grooved members 48 and 60 will be taken up by spring 124. The tool 88 may be removed and the operation continued at other locking devices of which several are shown in Fig. 1.

When it is desired to separate the panels, the tool 88 is inserted in the opening 86 and moved in a counter-clockwise direction. When this occurs the detent is moved from the position shown in Fig. 5 until the sphere 100 enters the slot 102 and engages the rear wall 103. Further rotation of the cam causes the detent mechanism to effect rotation of the loosely fitting hook member 92 until pin 106 engages the abutment 79, as seen in Fig. 7, whereupon the hook is moved to a retracted position within the casing 75 and has disengaged from the latch 116.

The advantages of my invention reside in providing a relatively simple locking mechanism which is embedded in the cooperating joining surfaces of a pair of wall members and which is capable not only of locking the wall members together, but of exerting a certain amount of pressure between the wall members through the action of the locking mechanism. Moreover, by having all of the parts contained within cooperating walls the likelihood of loss of parts is avoided. The particular advantage of the invention resides in the fact that repeated use does not destroy the utility of the locking mechanism and it may be operated by persons who need not be skilled mechanics.

While the invention is here disclosed as being used in combination with a knock-down type of refrigerator construction, for which it is particularly adapted, it is not necessarily limited to that particular construction since it forms a satisfactory manner of securing the walls of a cabinet or other similar arrangement which would normally be of a relatively permanent arrangement. Therefore, my invention is not limited to the single disclosure made herein, but rather to the full extent of the appended claims.

I claim:

1. A locking mechanism, comprising a latch, a locking member formed with a hook for engaging the latch, a rotatably driven member having an eccentric axis of rotation forming a rotatable support for the locking member, said driven member being adapted for rotation on an eccentric axis through an over-center posiiton with respect to the latch for moving the locking member into locking relationship with the latch, and a spring biased detent carried by one of said members and engaging the other member to form a driving connection and releasing said members when the locking member engages the latch permitting continued movement of the driving member through its over-center position with respect to the latch.

2. A locking mechanism, comprising a latch, a locking member having a hook at one end for engaging the latch and containing an aperture adjacent its other end, a cam formed with an eccentric axis of rotation extending through the aperture in the locking member and adapted to eccentrically move the locking member into engagement with the latch and on continued rotation passing through an over-center position with respect to the latch to interlock the locking member with the latch, and a spring biased detent carried by the cam and engaging the locking member forming a driving connection which is released when the locking member engages the latch permitting the cam to continue to move through its over-center locked position.

3. A locking mechanism, comprising a latch, a locking member formed with a hook adjacent one end for engaging the latch and having an aperture adjacent its other end, a cam having an eccentric axis of rotation extending through the aperture in the locking member and forming a rotatable support for said member, means supporting the cam for eccentric rotation through an over-center position with respect to the latch, a spring biased detent carried by the cam and engaging the locking member and forming a driving connection which is released when the locking member engages the latch permitting the cam to continue its movement through the over-center position with respect to the latch, and resilient means carried by the latch providing yieldable movement of the latter with the locking member while in locking engagement.

4. A locking mechanism, comprising a latch, a locking member formed with a hook for engaging the latch, a rotatably driven member having an eccentric axis of rotation forming a rotatable support for the locking member, means supporting said driven member for eccentric rotation through an over-center position with respect to the latch, a spring biased detent carried by the driven member and engaging the locking member and releasing the driven member from the locking member when the latter engages the latch, means cooperable with the driven member for arresting its movement when the latter has moved through its over-center position with respect to the latch, and resilient means cooperable with the latch to provide yielding movement of the latch with the locking member when in locking engagement.

5. In combination with a pair of walls each having a joining surface cooperable with the joining surface of the other wall to form a junction between said walls, a first casing carried within the joining surface of one of said walls, a latch member supported by said casing, a second casing carried within the joining surface of the other of said walls, a locking member within said second casing having a hook-shaped portion adapted to extend beyond the plane of the joining surface and engage said latch, a cam having an eccentric axis of rotation carried within said second casing and forming a support for one end of the locking member, said cam being adapted for rotation through an over-center position with respect to the latch, a spring biased detent carried by the cam and forming an operative connection between the cam and the locking member, and yieldably releasing the cam when the locking member engages the latch, limiting means carried by said casing and engageable with a portion of the cam when the latter moves through its over-center position, and yieldable means carried by one of said casings and cooperable with its respective member providing yieldable movement between the locking member and the latch when said members are in locked engagement with each other.

FREDERICK M. JONES.

References Cited in the file of this patent

UNITED STATES PATENTS

| Number | Name | Date |
|---|---|---|
| 1,250,574 | Ferris | Dec. 18, 1917 |
| 1,438,757 | Goddard | Dec. 12, 1922 |
| 1,534,701 | Gray | Apr. 21, 1925 |
| 2,340,864 | Carpenter | Feb. 8, 1944 |
| 2,378,654 | Pekny | June 19, 1945 |
| 2,486,686 | Shreve | Nov. 1, 1949 |
| 2,540,468 | Anderson | Feb. 6, 1951 |